(12) United States Patent
Smit et al.

(10) Patent No.: US 11,708,930 B2
(45) Date of Patent: Jul. 25, 2023

(54) METHOD FOR RENOVATING THE INTERIOR OF A HOLLOW STRUCTURE

(71) Applicant: WN Smitgroep, Purmerend (NL)

(72) Inventors: Nicolaas Petrus Frederikus Maria Smit, Zuidoostbeemster (NL); Menno Mathijs Smit, Zuidoostbeemster (NL)

(73) Assignee: WN SMITGROEP, Purmerend (NL)

(*) Notice: Subject to any disclaimer, the term of this patent is extended or adjusted under 35 U.S.C. 154(b) by 678 days.

(21) Appl. No.: 16/615,710

(22) PCT Filed: May 28, 2018

(86) PCT No.: PCT/NL2018/050347
§ 371 (c)(1),
(2) Date: Nov. 21, 2019

(87) PCT Pub. No.: WO2018/217092
PCT Pub. Date: Nov. 29, 2018

(65) Prior Publication Data
US 2020/0173596 A1 Jun. 4, 2020

(30) Foreign Application Priority Data

May 26, 2017 (NL) .................................... 2018980
Nov. 9, 2017 (NL) .................................... 2019872

(51) Int. Cl.
*F16L 55/165* (2006.01)
*B29C 63/00* (2006.01)
(Continued)

(52) U.S. Cl.
CPC ...... *F16L 55/1656* (2013.01); *B29C 63/0017* (2013.01); *B29C 63/28* (2013.01);
(Continued)

(58) Field of Classification Search
CPC ............... F16L 55/1656; F16L 55/1651; F16L 55/1654; F16L 55/18; E02D 29/128; B29C 63/34
(Continued)

(56) References Cited

U.S. PATENT DOCUMENTS 5,186,987 A * 2/1993 Imoto .................. F16L 55/1656
264/269
6,368,025 B1 * 4/2002 McNeil ................. E02D 29/124
156/287
(Continued)

FOREIGN PATENT DOCUMENTS

EP 0704294 A2 4/1996

OTHER PUBLICATIONS

International Search Report and Written Opinion dated Oct. 16, 2018 for International Application No. PCT/NL2018/050347, Filed May 28, 2018.

*Primary Examiner* — Patrick F Brinson
(74) *Attorney, Agent, or Firm* — Cook Alex Ltd.

(57) ABSTRACT

A method for renovating the interior of a hollow structure such as a sewerage pit (1) is described. The method provides an access opening (16) to the hollow structure (1); provides a plurality of material sheets (3) comprising reinforcing fibers and a curable resin composition through the access opening (16) and against a wall (11*a*, 11*b*) of the hollow structure (1); and provides an inflatable pressure means (4*a*, 4*b*) within the hollow structure (1). The pressure means (4*a*, 4*b*) are inflated against the wall (11*a*, 11*b*). A curing means (6) is then provided within the hollow structure (1) for curing the resin composition; and the resin composition is cured to harden the material sheets and provide a renovated interior of the hollow structure (1).

25 Claims, 8 Drawing Sheets

(51) Int. Cl.
  *B29C 63/28* (2006.01)
  *B29C 63/34* (2006.01)
  *E02D 29/12* (2006.01)
  *F16L 55/18* (2006.01)
  *B29K 33/04* (2006.01)
  *B29K 67/00* (2006.01)
  *B29K 201/00* (2006.01)
  *B29K 305/12* (2006.01)
  *B29K 307/04* (2006.01)
  *B29K 309/08* (2006.01)
  *B29K 311/10* (2006.01)
  *B29L 23/00* (2006.01)

(52) U.S. Cl.
  CPC .......... *B29C 63/341* (2013.01); *E02D 29/124* (2013.01); *F16L 55/1651* (2013.01); *F16L 55/1654* (2013.01); *F16L 55/18* (2013.01); *B29K 2033/04* (2013.01); *B29K 2067/06* (2013.01); *B29K 2201/00* (2013.01); *B29K 2305/12* (2013.01); *B29K 2307/04* (2013.01); *B29K 2309/08* (2013.01); *B29K 2311/10* (2013.01); *B29L 2023/006* (2013.01); *B29L 2023/22* (2013.01); *E02D 2300/007* (2013.01)

(58) Field of Classification Search
  USPC .............. 138/98, 97; 405/184.3, 184, 154.1; 156/287
  See application file for complete search history.

(56) References Cited

U.S. PATENT DOCUMENTS

| | | | | |
|---|---|---|---|---|
| 8,580,364 | B2* | 11/2013 | Quitter | B32B 27/12 405/184.2 |
| 8,821,068 | B2* | 9/2014 | Kiest, Jr. | E02D 29/12 264/269 |
| 2010/0018631 | A1* | 1/2010 | Kiest, Jr. | F16L 55/1651 405/150.1 |
| 2012/0112375 | A1* | 5/2012 | Kiest, Jr. | E02D 29/128 264/32 |
| 2015/0192237 | A1* | 7/2015 | Kiest, Jr. | F16L 55/1654 138/97 |
| 2016/0169437 | A1* | 6/2016 | Schwert | F16L 55/1656 138/97 |

* cited by examiner

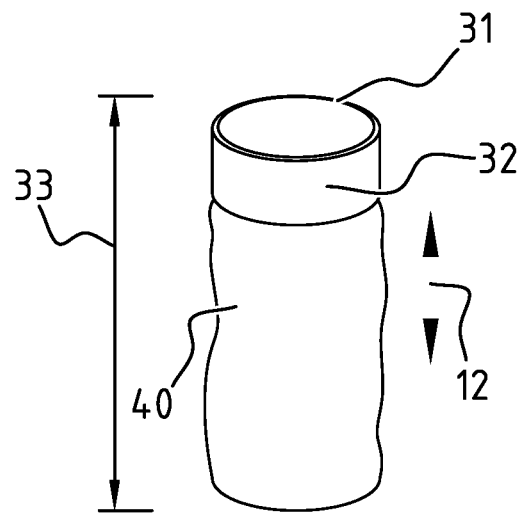
FIG. 11
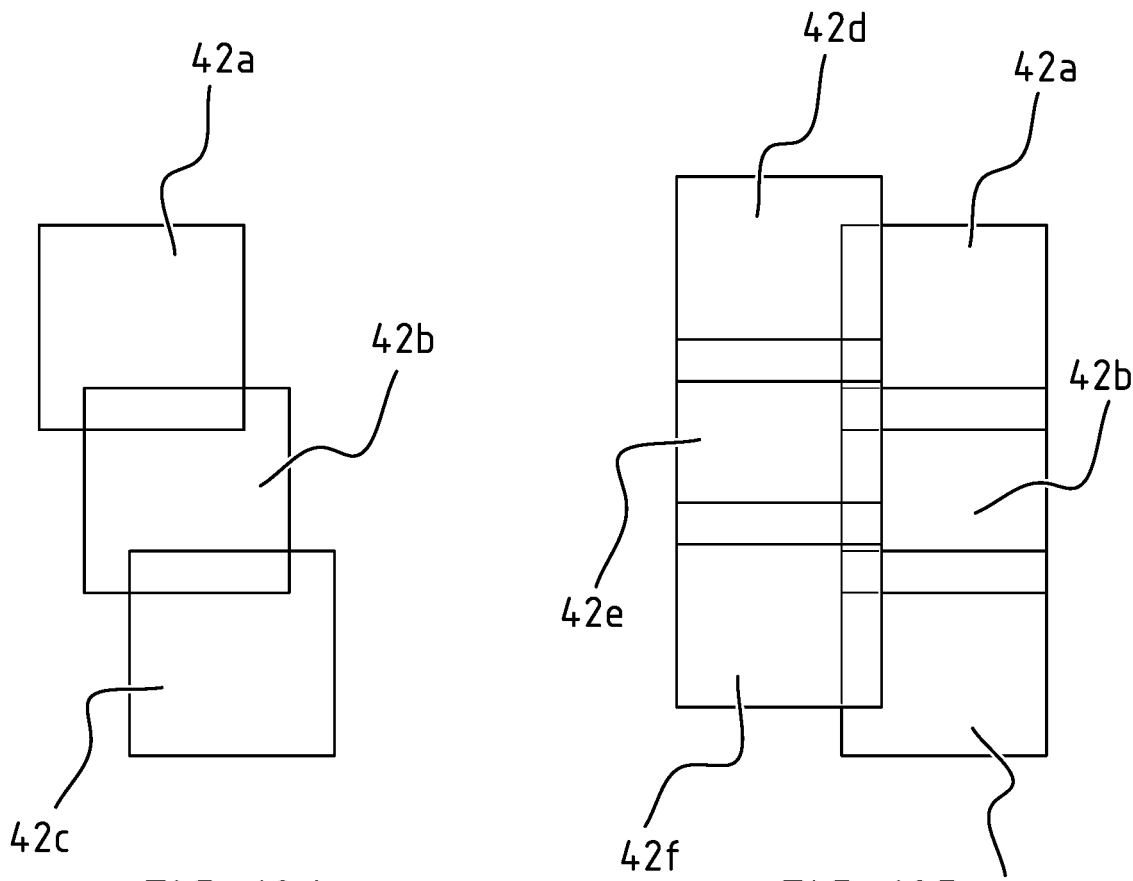
FIG. 12A
FIG. 12B

METHOD FOR RENOVATING THE INTERIOR OF A HOLLOW STRUCTURE

CROSS-REFERENCE TO RELATED APPLICATIONS

This is a U.S. National Stage of International Patent Application No. PCT/NL2018/050347 filed May 28, 2018, which claims the benefit of and priority to Netherlands Application No. 2018980, filed May 26, 2017 as well Netherlands Application No. 2019872, filed Nov. 9, 2017, all of which are incorporated by reference herein in their entireties.

FIELD OF THE INVENTION

The present invention relates to a method for renovating the interior of a hollow structure such as a sewerage pit. The invention further relates to a preform and to a material sheet for use in renovating a hollow structure, and to a method for manufacturing the material sheet and the preform.

BACKGROUND OF THE INVENTION

The present invention is illustrated in the context of renovating a sewerage pit, but the invention is not limited thereto and may be used for renovating other hollow structures such as tanks and wells for instance, in particular underground hollow structures. Non-limiting examples include hollow structures for holding a fluid, such as fat pits, fuel pits or tanks, gas tanks and sewer manholes, and hollow structures intended to keep a fluid out, such as storage cellars, basements, pumping stations and the like.

Renovation in the context of the present application is meant to denote an adaptation to an existing structure that has at least partly lost (curative renovation) or will at least partly loose (preventive renovation) one of its functions.

The importance of in-situ renovation of underground structures such as sewerage pits is increasing due in part to an ageing sewerage system. A sewerage pit indeed may be subject to corrosion since it frequently comes in contact with strong acids such as biogenic sulfuric acid. Corroded walls and bottom parts may affect the structural integrity of the pit and the pit and its surroundings may as a result become unstable. Water tightness may also be lost and unwanted fluids may leak in the surrounding ground layers or (fresh) water may enter the pit.

A known method for renovating a sewerage pit involves profiling the walls of the sewerage pit with a mortar, and optionally fastening fiber-reinforced composite plates onto the mortared walls. Although corners may be filled with additional mortar, water tightness represents one of the remaining problems. Another method involves hand laminating layers of fibrous reinforcement on the mortared walls and impregnating these layers with a suitable resin composition which is subsequently cured. Although this method may increase the structural stability of the pit, it takes too much time and properties tend to vary too much across the pit, leading to weak spots that may cause problems. Adhesion of the fiber-reinforced covering to the, optionally mortared, walls may also be suboptimal, for instance caused by a moist environment within the hollow structure leading to reduced adhesion or even structural loss.

There is a need therefore for an improved method for renovating an underground hollow structure such as a sewerage pit which at least in part obviates the disadvantages of the known method. It would in particular be desirable to provide a more efficient, reliable and/or durable method for renovating an underground hollow structure.

SUMMARY OF THE INVENTION

In a first aspect of the invention a method for renovating the interior of a hollow structure is provided in accordance with claim 1. The method in particular comprises providing an access opening to the hollow structure; providing a plurality of material sheets comprising reinforcing fibers and a curable resin composition through the access opening and against a wall of the hollow structure; providing an inflatable pressure means within the hollow of the structure; inflating the pressure means against the wall; providing a curing means within the hollow of the structure for curing the resin composition; and curing the resin composition to harden the material sheets and provide a renovated interior of the hollow structure.

The invented method allows securing a renovation material formed by the reinforcing fibers and curable resin composition within a hollow structure in an efficient way, thereby forming a renovated interior of the hollow structure that is preferably a load bearing structure on its own. The hardened material sheets need not adhere to the wall to perform the intended function.

The invention is in particular advantageous in an embodiment of the method wherein an underground hollow structure is renovated, more preferably a sewerage pit.

With the wording 'substantial' or 'substantially' is meant in the context of the present application at least 70% of the indicated property, more preferably at least 80%, even more preferably at least 90%, and most preferably at least 95% of the indicated property.

The reinforcing fibers and the curable resin composition may be applied against the wall by spraying. In a spraying operation, reinforcing fibers of some length are projected from a spray gun together with a resin composition against a substrate such as the wall of the structure. They accumulate at the substrate as a composite material covering of the substrate. After cure, the material covering provides strength and stiffness. Spraying of reinforcing fibers and a resin composition onto a surface is known per se but mechanical and other properties tend to be less than when other fiber reinforced composite material forms are used. Providing reinforcing fibers and a curable resin composition through the access opening and against a wall of the hollow structure by spraying, and inflating the pressure means against the wall surprisingly yields a cured covering with better properties than expected. Also, a relatively smooth and even surface of the covering is obtained which benefits durability and further allows an improved control of the thickness of the covering. Inspection of the covering for defects is also facilitated.

In a useful embodiment of the method according to the invention, the material sheets that comprise the reinforcing fibers and the curable resin composition are provided against the wall of the hollow structure while holding an upper edge of the material sheets with securing means. This embodiment has several advantages as will be elucidated below.

The invented method may accommodate many shapes of the hollow structure, including those that have a relatively small access opening that widens into an enlarged wider hollow (cavity) of the structure at a larger depth. The reinforcing fibers and resin composition, and in particular the cured material sheets may further adhere well to the often corroded and moist walls of concrete or mortar, which has a positive effect on the lifespan of the renovation. The method allows finishing a typical renovation job within less than a day, which reduces hindrance to the surroundings.

The method provides a fiber-reinforced covering to the inside wall(s) of the hollow structure that—for an underground structure—provides an adequate buffer against water ingression into the structure from the ground surrounding the structure, as well as leakage from fluids from within the structure to the ground. The method readily allows providing a structural function to the fiber-reinforced covering as well by tailoring the total thickness of the applied material sheets and a good level of adhesion of such fiber-reinforced covering to the inside of the structure, as will be elucidated further below.

Another embodiment of the invention relates to a method comprising providing an inflatable preform that comprises the material sheets, which preform is configured to substantially conform to the interior shape of the hollow structure when inflated outside the hollow structure; and which preform also acts as the inflatable pressure means.

An embodiment of the invention provides a method wherein the securing means is part of the preform, for instance provided at an upper edge of the preform. Such an embodiment allows for an easier handling of the preform. Attachment of the preform to an access opening of the hollow structure to be renovated may also be achieved with the securing means. Applying an at least partial vacuum in the preform—as will be described further below—is also facilitated by the securing means integral to the preform.

Another embodiment of the invention relates to a method wherein the reinforcing fibers and the curable resin composition of the preform are contained in an envelope comprising an inner covering layer facing the inside of the preform and an outer covering layer facing the outside of the preform. Such an embodiment allows holding the reinforcing fibers and the curable resin composition of the preform together and—in some embodiments—may provide form stability to the preform, at least partly.

An embodiment of the method providing some form stability to the preform and therefore allowing an easier transport and application of the preform inside a hollow structure is offered by a preform wherein an at least partial vacuum is applied within its envelope. The at least partial vacuum holds the inner and outer covering layer together thereby also holding the reinforcing fibers and the curable resin composition substantially in place.

The covering layers of the preform may comprise any suitable material as long as this material allows inflating the preform into a shape that substantially conforms to the interior shape of the hollow structure. In an embodiment of the method a covering layer comprises a polymeric film. A rubber may also be used.

According to an embodiment of the invention, a method is provided wherein the reinforcing fibers and the curable resin composition are provided as material sheets, i.e. relatively flat, two-dimensional (2D) material structures. Another embodiment relates to a method wherein the preform comprises a plurality of material sheets. The plurality may comprise 2-10 material sheets, but, depending on the size of the hollow structure to be renovated, may also comprise 10-200 material sheets, and even more.

Another embodiment provides a method wherein the material sheets at least partly overlap each other. In an embodiment in which the material sheets are provided in a preform, the overlap allows overstretching the preform when inflated without causing gaps between the material sheets, Overstretching may for instance be desired to cover discrepancies between the shape of the interior of the hollow structure and the shape of the preform in an inflated state.

An embodiment of the invention provides a method wherein the curable resin composition of the material sheets is partially cured before providing them against the wall. This partial cure may be done on site but is preferably carried out off site, for instance in a separate material sheet or preform factory. This embodiment of the method is instrumental in further limiting the variability of properties across the hollow structure or pit.

In yet another embodiment of the invention, the curable resin composition comprises a thickening agent and the resin composition is thickened. This thickening may be done on site but is preferably carried out off site, for instance in a separate material sheet or preform factory.

In another aspect of the invention therefore, a material sheet for use in renovating a underground hollow structure, in particular an underground hollow structure such as a sewerage pit, is provided, the material sheet comprising a layer of reinforcing fibers and a resin composition, wherein the reinforcing fibers are arranged in the form of a woven fabric and/or unidirectional (UD) fabric, and the resin composition is partially cured.

In the material sheet, reinforcing fibers and/or particles are embedded in a matrix resin composition, which can either be thermosetting or thermoplastic, but is preferably thermosetting.

The invention also relates to a preform for use in renovating a hollow structure. The preform is configured to substantially conform to the interior shape of the hollow structure when inflated outside the hollow structure, and further comprises a plurality of material sheets comprising reinforcing fibers and a curable resin composition contained in an envelope. The envelope comprises an inner covering layer facing the inside of the preform and an outer covering layer facing the outside of the preform.

In a useful embodiment, the preform further comprises a securing means for holding an upper edge of the preform. The securing means helps in handling the preform during transport for instance, but may also be used to hold the preform by the upper edge thereof when bringing the preform inside the hollow structure. The securing means may for instance be embodied as an annular ring attached to the preform upper edge.

To assist in keeping the material sheets inside the preform in their desired position, a preform according to an embodiment of the invention is configured to have an at least partial vacuum present within the envelope.

As already elucidated above, useful embodiments of the invention comprise a preform wherein a covering layer comprises a polymeric film; and/or which comprises a plurality of material sheets, wherein the material sheets preferably at least partly overlap each other; and/or wherein the curable resin composition of the preform is partially cured or thickened before providing the preform inside the hollow structure; and/or wherein the curable resin composition comprises a thickening agent and the resin composition is thickened.

The preform in accordance with the invention may be manufactured in any suitable way. The invention however provides a method for manufacturing a preform, the method comprising providing a 3D model of the interior of a hollow structure, from the model providing a mold with the shape of the interior, providing reinforcing fibers and a curable resin composition onto the mold and at least partly cure or thicken the resin composition.

The 3D model of the interior of the hollow structure may be obtained by any means known in the art. A preferred method for obtaining the 3D model comprises laser scanning. 3D laser scanning digitally captures the shape of physical objects using a line of laser light. A laser probe projects a line of laser light onto the surface to be scanned while sensor cameras continuously record the changing distance and shape of the laser line in three dimensions (XYZ) as it sweeps along the object. The shape of the object then appears as a so-called point cloud comprising many data points. Point cloud data files are created and merged into a three-dimensional representation of the object and optionally post-processed with various software packages known per se. The point cloud data may for instance be used to create a 3D CAD model of the object's geometry, which CAD model enables the precise reproduction of the scanned object in a surface or solid model. In the invented method a mold is created from the model, which mold reproduces the shape of the interior of the hollow structure to a desired accuracy.

An embodiment of the method to obtain the preform comprises providing an inner covering layer onto the mold, providing the reinforcing fibers and the curable resin composition in the form of material sheets onto the inner covering layer to form a fibrous composite layer, and providing an outer covering layer onto the fibrous composite layer.

Uncured thermosetting resin compositions typically comprise constituents such as monomers and a hardener, which react together to produce a cross-linked resin after cure. Other thermosetting resin compositions may comprise oligomer or polymer molecular chains of some length dissolved in a reactive solvent, such as styrene. The reactive solvent combines with the molecular chains when initiated to form a cross-linked network. The thermosetting resin composition may be selected such that curing occurs at room temperature or at higher temperatures, typically ranging between 80 and 200° C. During curing, the constituents of a resin mixture react and the viscosity of the mixture increases to infinity while forming a cross-linked solid resin. After curing, a thermosetting resin exhibits a glass transition temperature, above which considerable softening of the thermosetting resin occurs and the thermosetting resin behaves like a rubber. A post-cure may be used to increase the glass transition temperature and obtain a substantially complete degree of cure or full cure.

According to an embodiment of the invention, the curable resin composition of the material sheet is partially cured such that it still comprises reactive moieties. A partial cure is defined as any degree of cure that differs from zero and from a fully cured state. Further, the degree of partial cure is controlled in the sense that the resin composition may reach a stable state at a storage temperature during a storage time period of some length, which is at least 1 day at room temperature, more preferably at least 2 weeks at 10° C. The degree of cure of the thermosetting resin composition may be established according to well known standard practices. A suitable and widely used technique measures (changes in) enthalpy using Differential Scanning Calorimetry (DSC). The degree or extent of cure is defined as the change in enthalpy that has occurred, compared to the total change of enthalpy of a complete reaction (a substantially full cure or 100% degree of cure). The total change of enthalpy involved in completing a curing reaction is determined by using a slow temperature ramp from a low temperature to a temperature close to the onset of thermal degradation. To define the degree of cure of the curable resin composition in an article according to the invention would involve taking a sample of such resin from the second part, and determining the residual change in enthalpy using a slow temperature ramp from a low temperature to a temperature close to the onset of thermal degradation of the second thermosetting resin. The degree of cure is then defined by the ratio of the total enthalpy change minus the residual enthalpy change, to the total enthalpy change of the resin. Although DSC is the technique of choice in determining degree of cure and therefore a state of partial cure of the curable resin composition, other techniques may also be used, such as Dynamic Mechanical Analysis (DMA) for instance.

The curable resin composition, for instance when comprising epoxide moieties, may be B-staged. The wording "B-staged" as employed herein designates that partial curing (partial crosslinking) of the thermosetting resin composition has occurred. The "B-stage" of a thermosetting resin composition is well known to one skilled in the art and is defined by an intermediate stage in the reaction of certain thermosetting resins in which the material softens when heated and swells when in contact with certain liquids, but may not entirely fuse or dissolve. In the B-stage, a thermosetting resin may provide a tacky surface but this is not essential.

In a useful embodiment of the material sheet, the curable resin composition is stable at a temperature of −10° C. In such embodiment, the second resin will not substantially cure (change its degree of cure) at a temperature of −10° C. for at least one day, more preferably for at least one week, even more preferably for at least one month, even more preferably for at least three months, and most preferably for at least six months.

In other useful embodiments, the curable resin composition is stable at a temperature of −5° C., more preferably at a temperature of 0° C., even more preferably at a temperature of 5° C., even more preferably at a temperature of 10° C., even more preferably at a temperature of 15° C.

The material sheet in accordance with the invention may comprise a wide range of available thermosetting resin compositions. It is for instance possible to provide a material sheet wherein the thermosetting resin composition comprises an epoxy, unsaturated polyester, phenolic, polyurethane, or bismaleimid resin/hardener mixture, or combinations thereof, such as two-component systems based on thermosetting urethane.

A preferred embodiment of the material sheet however comprises an unsaturated polyester resin/hardener mixture. The unsaturated polyester in the material sheet according to the invention may be amorphous or (semi-)crystalline and is any polyester obtained through the reaction of organic compounds containing carboxyl and/or alcohol groups. At least one of the starting compounds contains unsaturated groups. Unsaturated polyesters are usually built from one or more aliphatic and/or cycloaliphatic mono-, di- and/or polyvalent alcohols and one or more aliphatic, cycloaliphatic and/or aromatic di- or polyvalent carboxylic acids and, optionally, monocarboxylic acids and/or the esters and anhydrides derived therefrom.

Examples of suitable alcohols are benzyl alcohol, ethylene glycol, diethylene glycol, triethylene glycol, propylene glycol, dipropylene glycol, neopentyl glycol, butanediol, pentanediol, hexanediol, dimethylol cyclohexane, glycerol, trimethylol propane, pentaerythritol, dipentaerythritol, hydrogenated bisphenol-A, 2,2-bis-(2-hydroxyethoxy)phenylpropane and/or 2,2-bis-(2-hydroxypropoxy)phenylpropane.

Examples of suitable di- or polyvalent carboxylic acids are fumaric acid, maleic acid, chloromaleic acid, itaconic acid, citraconic acid, malonic acid, succinic acid, glutaric acid, methylglutaric acid, adipic acid, sebacic acid, 1,4-cyclohexanedicarboxylic acid, phthalic acid, isophthalic acid, terephthalic acid, trimellitic acid, dihydrophthalic acid, tetrahydrophthalic acid, hexahydrophthalic acid, tetrachlorophthalic acid, endomethylene tetrahydrophthalic acid (HIMIC), hexachloro endomethylene tetrahydrophthalic acid and/or the corresponding esters or anhydrides.

Other polyesters suitable as curable resin composition, preferably for the material sheet, according to the invention are vinyl-ester polymers. Vinyl-ester polymers, also known under the name of epoxy (meth)acrylates, are the addition products of polyepoxides and unsaturated carboxylic acids, preferably acrylic acid and methacrylic acid. Suitable polyepoxides are epoxy novolak resins and in particular polyepoxides based on bisphenol A. Another class of suitable vinyl-ester polymers consists of the esterification products of alkoxylated bisphenol A and (meth)acrylic acid. Yet other suitable polyesters comprise vinyl ester urethane polymers. Vinyl ester urethane polymers, also known under the name of urethane (meth)acrylates, are the addition products of a polyvalent isocyanate, a polyvalent alcohol and/or amine and a hydroxyalkyl (meth)acrylate.

The unsaturated polyester composition further comprises a monomer that is copolymerizable with the polyester. This monomer contains one or more vinyl groups and usually fewer than 50 carbon atoms. Suitable monomers are for example of a vinyl aromatic, vinyl ether, vinyl ester, acrylate and/or allyl type. Preferably the monomer is vinyl aromatic. Such vinyl aromatic monomers may be chosen from the group comprising styrene, α-methylstyrene, o-, m-, p-methylstyrene, p-chlorostyrene, t-butylstyrene, divinyl benzene, bromostyrene, vinyl naphthalene, α-chlorostyrene and divinyl naphthalene. Preferably styrene is used.

Acrylate compounds are for example chosen from the group comprising methyl, ethyl, propyl, isopropyl, butyl, isobutyl, phenyl and benzyl acrylate or methacrylate, 2-ethylhexyl (meth)acrylate, dihydrocyclopentadiene acrylate, cyclohexyl (meth)acrylate, butanediol (meth)acrylate, butanediol di(meth)acrylate, (meth)acrylamide, the reaction products of (meth)acrylic acid and phenyl or cresyl glycidyl ethers, propylene glycol di(meth)acrylate, di- and triethylene glycol di(meth)acrylate, di- and tripropylene glycol di(meth)acrylate, hexanediol di(meth)acrylate and trimethylol propane tri(meth)acrylate. Preferably hydroxyethyl methacrylate and hydroxypropyl methacrylate are used.

Vinyl ether, vinyl ester and allyl compounds are for example chosen from the group comprising allyl phthalate, diallyl phthalate, diallyl isophthalate, triallyl cyanurate, diallyl terephthalate, vinyl acetate, vinyl propionate, vinyl pivalate, vinyl ether, vinyl versatate, vinyl propylol ether, divinyl ether, vinyl butylol ether and vinyl benzyl alcohol ethers.

According to a preferred embodiment, the resin composition of the material sheet comprises a thickening agent and the resin composition is thickened in a controlled way. Thickened unsaturated polyester or vinylester resins are particularly preferred. Chemical thickening involves adding thickening agents to the resin composition which cause an increase in the molecular weight of the polymer chains in a controlled way. This means that the resin's viscosity as a result of the chemical thickening rises up to a pre-determined viscosity plateau where it levels off and stays for a prolonged period of time. The thickened resin of the materials sheets (and preform in appropriate embodiments) therefore exhibits an increased yet controlled viscosity. A thickened resin is typically not cross-linked and requires cross-linking to occur during cure. Thickening agents are known to a person skilled in the art and comprise for example oxides and hydroxides of the metals of groups I, II and III of the Periodic System. Examples of suitable thickeners comprise oxides or hydroxides of magnesium, lithium, calcium and/or aluminum. Preferably use is made of magnesium oxide. It is also possible to use agents that accelerate thickening, such as cholinchloride and/or semi-esters of a polyetherpolyol and maleic anhydride. It is also advantageous to add thickening additives to the resin composition. Such thickening additives can be added if a thickened resin composition is desired and the unsaturated polyester has a low concentration of carboxyl groups, such as in vinyl ester or vinyl ester urethane resins. Examples of suitable thickening additives are vinyl polymers containing carboxyl groups, or semi-esters of a polyether polyol with a dicarboxylic anhydride. It is also possible to use a polyisocyanate, optionally combined with a metal oxide or metal hydroxide.

The thickening agent is used in amounts of between 0.1 and 10 wt. %, relative to the amount of the unsaturated polyester or vinylester component in the resin composition.

The resin composition may further contain fillers commonly used in the art. Suitable fillers are for example calcium carbonate, kaolin, heavy spar, dolomite, quartz flour, slate flour, talcum, aluminum trihydrate, sand and optionally pigments and colorants. It is also possible to add further reinforcing materials such as hollow or solid glass beads and plate-shaped materials such as mica for instance. It is also possible to add thixotropic agents (such as colloidal silica, highly reactive silicic acids, bentones), and hydrogenated oils (such as for example castor oil) to the resin composition.

The resin composition may further comprise anti-shrink compounds, such as for example polyvinyl acetate, ethylene vinyl acetate, polystyrene, polyacrylates, such as for example polymethyl methacrylate, saturated polyesters, polyethylene, polyurethane and rubbers based on butadiene and styrene. Such anti-shrink compounds are usually referred to as low profile additives' (LPA). The resin composition may also comprise release agents, such as paraffin waxes and stearates for instance.

The material sheet according to an embodiment of the invention further contains inorganic and/or organic reinforcing fibers arranged in the form of a woven fabric and/or UD fabric. Additional short reinforcing fibers may be present, preferably having a weight average length of between 2 and 15 mm, most preferably between 4 and 6 mm. Suitable reinforcing fibers in the woven fabric and/or UD fabric comprise glass fibers, carbon fibers, cellulose, sisal and jute fibers and steel fibers. It is also possible to use synthetic organic fibers, such as for example fibers based on drawn polyethylene, polyamide and polycarbonate. The reinforcing fibers and the material sheet preferably comprise glass fibers.

A suitable amount of reinforcing fibers in the material sheet is between 5 and 90 wt. %, relative to the total weight of the material sheet, more preferably between 20 and 85 wt. %, even more preferably between 30 and 80 wt. %, and most preferably between 50 and 70 wt. %, relative to the total weight of the material sheet.

Woven fabrics comprise interlaced warp (00) fibers and weft (90°) fibers in a regular pattern or weave style. Drape (the ability of a fabric to conform) and stability of a woven fabric are controlled primarily by the weave style, which may include plain, twill, satin, basket, and leno weave styles, to name a few.

A more preferred material sheet comprises a layer of reinforcing fibers and a resin composition, wherein the reinforcing fibers are arranged in the form of a unidirectional (UD) fabric, and more preferably a biaxial 0/90 fabric, obtained by stacking two unidirectional fabrics on top of each other with fibers running perpendicular to each other, and connecting them, for instance by stitching.

A unidirectional (UD) fabric is one in which the majority of the reinforcing fibers run in one direction only. The majority may comprise more than 75 wt. % of the fibers, and preferably more than 90 wt. %. A relatively small amount of fiber or other material may run in other directions than the unidirectional direction with the main intention of holding the primary fibers in position. Unidirectional fabrics usually have their primary fibers in the 0° direction (along a warp direction). Unidirectional fabrics are also referred to in the art as stitched unidirectional fiber structures.

The number of layers in the material sheet may be chosen at will. A large number of layers tends to increase production rate but may be less optimal for rapid curing. According to an embodiment, the material sheet comprises 2 to 4 layers, more preferably 2 or 3 layers, and most preferably 2 layers. In case each layer is a biaxial 0/90 fabric, the layers are preferably arranged symmetrically with respect to a midplane of the material sheet.

The areal weight of the material sheet may also chosen at will but is preferably between 500-1200 $g/m^2$, more preferably between 600-1100 $g/m^2$, and most preferably between 700-1000 $g/m^2$.

Curing of the resin composition is preferably initiated by an initiator. Suitable initiators are free-radical-forming peroxides, such as for example diacyl peroxides, hydroperoxides, percarbonates and mixtures hereof. Suitable diacyl peroxides are for example diacetyl peroxide, dibenzoyl peroxide, di-p-chlorobenzoyl peroxide, phthaloyl peroxide, succinyl peroxide, dilauryl peroxide and acetylcyclohexane sulphonyl peroxide. Suitable hydroperoxides are for example methylethylketone peroxide, t-butylhydroperoxide, t-butylperbenzoate, cyclohexanone peroxide and cumene hydroperoxide. Suitable percarbonates are for example cyclohexane percarbonate and bis-(4-tert-butylcyclohexyl)-percarbonate.

A particularly preferred class of initiators comprises the photo-initiators. Photo-initiators are molecules adapted to create reactive species such as free radicals, cations and anions when exposed to radiation in the UV or visible wave length range. Suitable examples include but are not limited to azobisisobutyronitrile, benzoyl peroxide, and camphorquinone.

The resin composition, also of the material sheet, may optionally contain an accelerator. Suitable accelerators are for example tertiary amines and/or metal salts, which are added to the resin composition in relatively small amounts, preferably in amounts by weight of between 0.01 and 2 wt. %. Curing may also be carried out by providing heat and/or steam.

The resin composition, also of the material sheet, may optionally contain one or more inhibitors in an amount of between 0.005 and 0.2 wt. %, preferably between 0.01 and 0.1 wt. %, relative to the total weight of the resin composition. Inhibitors that are suitable for use are for example hydroquinone, 2,6-dimethylhydroquinone, 2,5-di-tert-butyl-hydroquinone, tert-butylcatechol, benzoquinone, chloranil, naphthoquinone, phenothiazine, copper naphthenate and thiodiphenylamine.

In another aspect of the invention a method for manufacturing a material sheet in accordance with an embodiment of the invention is provided, the method comprising providing a tubular film and bringing a woven fabric and/or UD fabric of fiber reinforcement into said tubular film, impregnating said fiber reinforcement with a resin composition comprising a curing agent and a thickening agent, and allowing the resin composition to thicken.

The thickening of the resin composition typically takes between 3 and 15 days at a temperature between 12 and 24° C. The resin composition according to the invention may be prepared by mixing the components in a suitable mixing apparatus such as a kneader or rolls. The use of the tubular film increases the stability of the resin composition in the material sheet, and the sheet may be stored for several weeks, typically for at most 8 to 9 weeks.

The materials sheet and/or a preform comprising a plurality of material sheets may be advantageously used in a method for renovating an underground hollow structure such as a sewerage pit, in particular in an embodiment of the method wherein the wall of the hollow structure is an upright wall. An upright wall extends substantially vertical or at an angle with the vertical direction, the angle typically ranging from 0 to 45°.

In another embodiment of the method, a bottom part of the structure is also provided with reinforcing fibers and the resin composition, preferably in the form of the material sheets, more preferably the complete bottom of the structure. The material sheets provided on the bottom part preferably overlap with materials sheets provided on the wall(s) of the hollow structure to form a structural unity.

The materials sheets are typically provided as rolls and unrolled downwards from the access opening of the structure towards the bottom thereof. After unrolling, the material sheets are secured against a wall of the hollow structure by applying fastening means, according to an embodiment. A preform comprising a plurality of material sheets is typically provided on the site and unfolded downwards from an access opening of the hollow structure towards the bottom thereof. After unfolding and inflating the preform, parts of the preform may be secured against a wall of the hollow structure by applying fastening means, according to an embodiment. This is not necessary however. Indeed, inflating the preform produces a structure that substantially conforms to the interior shape of the hollow structure.

In some cases, side walls of the hollow structure to be renovated may have holes, for instance for connection to pipes or tubing and the like. In such a case, the holes and part of the connected pipes are provided with a plug, for instance inflatable, to prevent any substance from entering the hollow structure through the hole. A specially developed tool is then preferably used to prevent the plug from entering the hollow, or to prevent other leakage. A preferred tool comprises an end plate, provided at one end of a central shaft. A mechanism is attached to the end plate and is configured to fix the toll against walls of the pipe or tubing. In an embodiment, the mechanism comprises three assemblies of shearing members, one member of each assembly at one end being hingedly connected to the end plate. The members can rotate or shear around a common hinge in order to bring the mechanism from a (partly) folded-in position to a folded-out position in which outer members of the mechanism may push against a wall of a pipe or tubing to fix the tool.

In an embodiment of the method, the tool is brought inside the hole with the central shaft aligned along the extension of the pipe or tubing, and the mechanism is operated to secure the tool against the walls, for instance by bringing the outer members against the walls. The end plate of the tool is typically located over some distance in the pipe or tubing away from the hole-containing wall of the hollow structure. A part of a material sheet hanging in front of a hole may then be cut along a number of radial lines and a circumference to form a hole in it that is slightly undersized with respect to the hole in the wall. Radial flaps are thus provided in the material sheet and these flaps are then brought against the walls of the pipe or tubing by folding them in the direction of the inward pipe or tubing. This may conveniently be done by the inflatable pressure means. This way of applying material sheets onto the walls of a pipe or tubing connected to a hole in a wall of the hollow structure provides a substantially leak-free covering of the walls of the pipe or tubing, and the connection of such pipe or tubing to the hollow structure.

For further improving water tightness, an embodiment of the method is provided wherein two material sheets overlap over an overlap distance. The overlap may be along side edges of two adjacently positioned material sheets or may be along an end part thereof. Although the width of the overlap may be chosen within a wide range, preferred overlap widths range from 0.01 to 1 m, more preferably from 0.05 to 0.50 m, and most preferably from 0.10 to 0.30 m.

The optional fastening means may be chosen among many possibilities, but an embodiment of the invention provides a method wherein the fastening means comprise mechanical fasteners such as nails and screws; or adhesive fasteners such as patches of fiber-reinforced adhesive; or combinations of both. The fastening means may be applied through the material sheets or parts of the preform in some embodiments to connect with the wall, or may be connected with the wall first and then with the material sheet.

The invented method further comprises the step of providing an inflatable pressure means within the hollow of the structure, and inflating the pressure means against the wall thereby bringing the reinforcing fibers and resin composition, and/or the material sheets in contact with the wall under pressure. The preform used in some embodiments of the invented method acts as an inflatable pressure means within the hollow of the structure. Inflating the preform to bring its outer surface close or against the wall of the interior of the hollow structure also brings the reinforcing fibers and resin composition towards said wall or against said wall, in which embodiment they may contact the wall under pressure.

In an embodiment of the method according to the invention, the uninflated pressure means when freely suspended has a shape with an internal volume exceeding the volume of the hollow of the structure by at most 20%, more preferably at most 10%, and most preferably at most 5%. Such an embodiment prevents at least to some extent the occurrence of wrinkles and other distortions in the pressure means and/or material sheets during inflation, as well as prevents incomplete curing. In embodiments of the method according to the invention that use a preform, the inflated preform when freely suspended has a shape with an internal volume exceeding the volume of the hollow of the structure by at most 20%, more preferably at most 10%, and most preferably at most 5%. Providing a preform substantially shaped as the hollow structure's interior prevents at least to some extent the occurrence of wrinkles and other distortions in the preform during inflation, as well as may prevent incomplete curing.

The inflatable pressure means may be manufactured in any conceivable way. However, an embodiment of the method wherein the inflatable pressure means is manufactured by providing a mold having substantially the shape of the hollow, and forming the pressure means in said mold, is preferred.

A convenient inflatable pressure means or cover layer for the preform in some embodiments comprises a rubber bladder. The rubber may be selected from those known in the art. In general these rubbers have a glass transition temperature T, lower than −10° C., although this is not essential. Rubbers suitable for application are for instance chosen from the group of natural rubbers, isoprene rubbers, butadiene rubbers, styrene butadiene copolymer rubbers, acrylonitrile butadiene copolymer rubbers, if desired copolymerized with styrene, butadiene isoprene copolymer rubbers, chloroprene rubbers, butyl and acryl rubbers, and ethylene-propylene copolymers which, if desired, comprise a third copolymerizable diene monomer such as for instance 1,4-hexadiene, dicyclopentadiene, dicyclooctadiene, methylene norbornene, ethylidene norbornene and tetrahydroindene. Mixtures of said rubbers are also possible. It is also possible to manufacture the inflatable pressure means from any plastic material that is suitable for this use. It is to be noted that the plastic material need not be elastic as a rubber, and an oversized plastic bag for instance may be suitable for its use.

An inflatable pressure means prepared from natural rubber latex is particularly preferred, due in part to its outstanding elongation, tear and recovery properties.

Another embodiment of the invention relates to a method wherein the inflatable pressure means or a cover layer of the preform is substantially translucent to the curing means. By this is meant that the translucence of the inflatable pressure means is sufficiently high in order not to substantially impair the action of the curing means. The pressure means in this embodiment at least allows the action of the curing means to occur in the curable resin composition of the material sheets substantially unhindered.

Yet another embodiment of the method according to the invention is characterized in that it comprises providing a first inflatable pressure means within the hollow of the structure and inflating said first pressure means, and providing a second pressure means within the first pressure means, and inflating said second pressure means against the wall of the hollow structure. This embodiment is more reliable and/or durable than other embodiments.

According to the invention a curing means is provided within the hollow of the structure for curing the resin composition. Curing the resin composition may adhere the reinforcing fibers and resin composition, preferably the material sheets, to the wall of the hollow structure, and/or may provide hardened material sheets, substantially in the shape of the hollow structure's interior without substantial adherence to the wall of the hollow structure. The hardened material sheets, in some embodiments a part of the preform, form a load-bearing relatively stiff structure on its own and represents an efficient and enduring renovation to the original hollow structure.

In principle, any curing means known in the art may be used to cure the resin composition in the material sheets. Suitable embodiments comprise methods wherein the curing means comprises a source of heat, light and/or sound.

Good curing behaviour is obtained in an embodiment wherein the curing means comprises a UV-light source having a wave length between 10 and 420 nm. It is advantageous to concentrate the emitted UV-light, preferably such that at least 50% of the UV-light is within a bandwidth of ±50 nm of a peak wavelength between 300 and 400 nm. A UV-light emitter having the claimed narrow wave length distribution may be used, but it is also possible to use a UV light source having a wider wavelength distribution and filtering the light to obtain the claimed narrow wave length distribution.

Although the power of the UV-light source may be varied within a large range, a preferred power of the UV-light source ranges from 0.5-100 W/cm², more preferably from 1-30 W/cm², and most preferably from 3-20 W/cm².

UV devices suitable for producing the UV light required for embodiments of the invention include UV-LED lamps.

Lenses may be used in order to keep the irradiation power at an even distance from the light source. The distance between the UV-light source and the hollow structure wall surface to be irradiated may be varied but is preferably close enough to prevent a large reduction of the irradiation power, which typically reduces with distance. A preferred distance between a product surface to be irradiated and a UV-light source is <75 mm, more preferably <50 mm, even more preferably <30 mm, and most preferably <20 mm.

The product may be irradiated by the curing source in a device that allows irradiation of substantially the complete wall surface once, or a few times. A preferred embodiment relates to a method wherein the curing means is moved within the hollow of the structure. Movement may be achieved in any conceivable way, such as by hanging the source from a rope or cable, by hoisting or spinning the curing source, or by providing a carrier onto which one or a plurality of curing sources are provided. A preferred embodiment of the method moves the curing source with a controlled speed within the hollow of the structure, preferably with a substantially constant speed.

The method of the invention can be used with advantage for renovating underground hollow structures. The hollow structures may be substantially closed structures, such as occurs in an underground tank, but may also be connected with outside tubing or pipelines, such as is the case in sewerage systems for instance. Accordingly, holes may be present in a wall of the hollow structure, which holes connect with tubing, pipelines, etc. A suitable embodiment of the invention provides a method according to which the wall of the hollow structure comprises holes and said holes are covered before applying the reinforcing fibers and resin composition, and/or the material sheets. Suitable coverings include plugs, sleeves, sockets, muffs, couplings, flanges and the like. The coverings may be inflatable or may be solid elements that fit into the holes.

The material sheets (optionally of the preform) once cured provide a watertight and preferably load-bearing structure within the hollow structure. The cured materials sheets may be provided with a suitable top-coat, which may for instance increase the chemical resistance of the structure.

The wall thickness of the composite structure in case of an underground sewerage pit for instance may depend on the ground water level and the lateral dimensions of the pit to be renovated. For an E-glass unsaturated polyester composite structure, wall thickness in the upright walls of the structure may—as an example—vary with ground water level from 4.5 to 13.5 mm for a square cross-sectional 660×660 mm pit, and from 6 to 28 mm for a 1500×1500 mm pit. Ground water level is supposed to vary between 1 and 5 m. The wall thickness of the bottom of the composite renovating structure may vary with ground water level from 4.0 to 11 mm for the 660×660 mm pit, and from 12 to 24 mm for the 1500×1500 mm pit. The indicated wall thicknesses are in now way limiting but illustrate workable structural dimensions. The described composite renovating structure is able to withstand the indicated ground water pressure without having to adhere to the wall of the existing pit to be renovated. Indeed, due to the possibility of curing shrinkage of the polyester resin, the composite structure may shrink away some from the existing pit walls, leaving a non-zero gap between the outside of the composite structure walls and the inside of the existing pit walls.

It is explicitly mentioned that the embodiments disclosed in the present application may be combined in any possible combination of these embodiments, and that each separate embodiment may be the subject of a divisional application.

BRIEF DESCRIPTION OF THE FIGURES

The invention will now be described in more detail by way of example, without however being limited thereto and with reference to the accompanying figures in which:

FIG. 11 schematically illustrates a side view of a preform used in the method in accordance with an embodiment of the invention;

FIGS. 12A, 12B schematically illustrate a side view of a number of possible patterns for laying up material sheets in a preform according to some embodiments of the invention;

DESCRIPTION OF PREFERRED EMBODIMENTS

Figure 1:
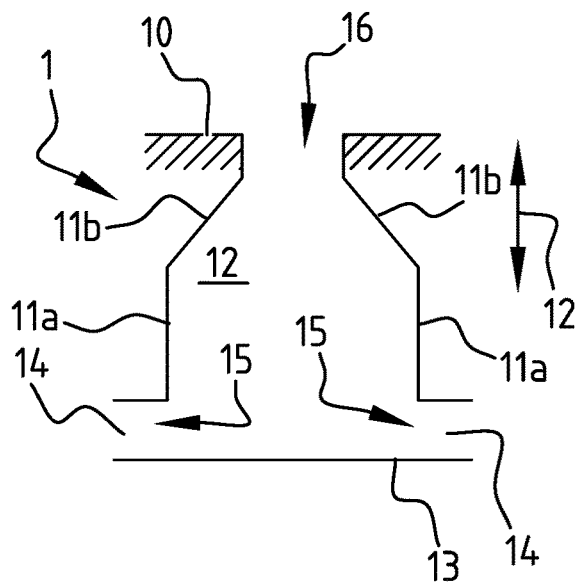
FIG. 1 schematically illustrates a cross-section of a sewerage pit to be renovated.

Referring to FIG. 1 is shown a cross-section of a sewerage pit to be renovated. The sewerage pit 1 is situated below ground-level 10 and has a number of walls (11a, 11b) and a bottom 13 that enclose a hollow volume 12. Some walls 11a extend about vertically upwards, while other walls 11b show an angle with the vertical direction 12. At bottoms height, the walls 11a of the pit 1 are provided with holes 15 that give access to sewerage pipes 14. At the top of the pit 1, an access opening 16 is provided through which the inner hollow 12 can be entered. The access opening 16 may be present already or may be provided as part of the method.

An embodiment of the method for renovating the underground sewerage pit 1 comprises providing the access opening 16 to the hollow 12 of the pit 1, as shown in FIG. 1.

Figure 2:
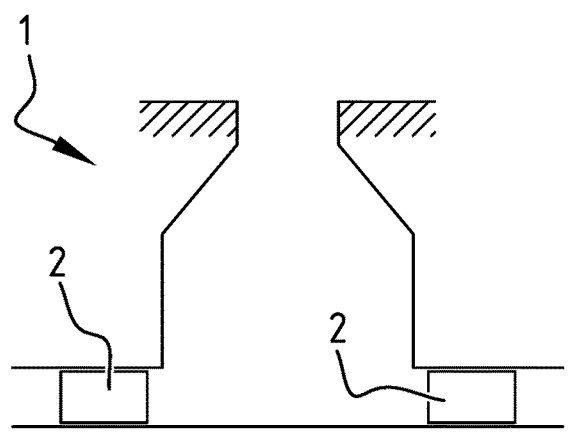
FIG. 2 schematically illustrates a cross-section of a step of the method in accordance with an embodiment of the invention.

As illustrated in FIG. 2, the access holes 15 to the sewerage pipelines 14 are then provided with plugs 2, which, in the embodiment shown are inflatable. The plugs 2 cover the holes 15 and provide a substantially smooth surface to the walls 11a of the pit 1.

Figure 3:
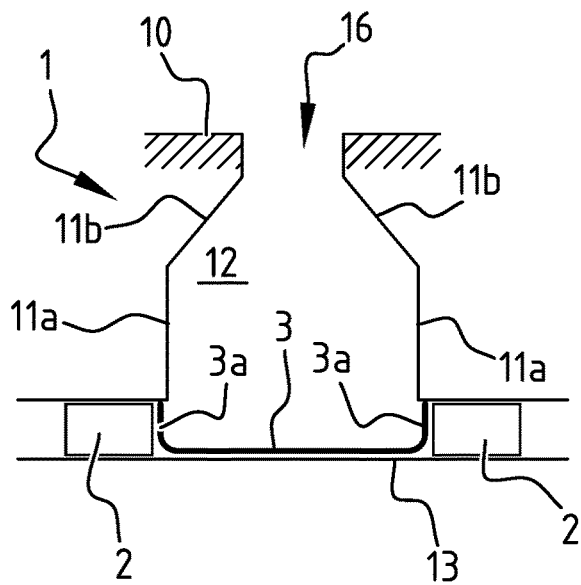
FIG. 3 schematically illustrates a cross-section of another step of the method in accordance with an embodiment of the invention.

In a next step of the method, as shown in FIG. 3, a number of materials sheets 3 are provided onto the bottom 13 of the pit 1. The materials sheets 3 comprise reinforcing E-glass fibres embedded in a thickened unsaturated polyester resin. The E-glass fibers are arranged in the form of two layers, each layer comprising a 0/90 UD fabric. The layers are arranged symmetrically with respect to a mid plane and enclosed within a black foil to avoid further curing during storage. The black foil is removed from the material sheets 3 before applying them to the bottom 13 of the pit 1. The material sheets 3 are applied to the bottom in an overlapping fashion to avoid any gaps between the material sheets 3. Side flaps 3a of the material sheets 3 are folded upwards to cover a lower part of the walls 11a.

Figure 4:
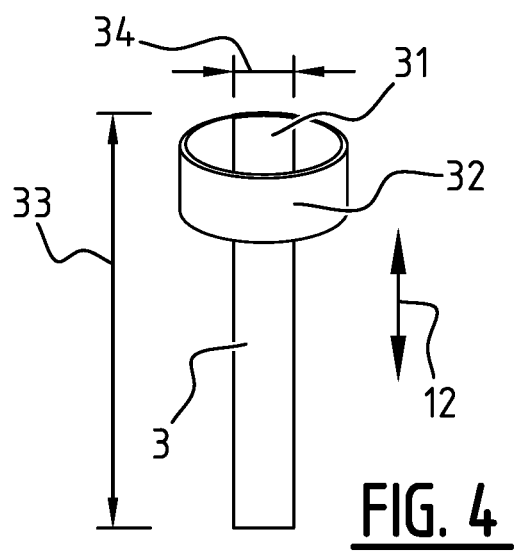
FIG. 4 schematically illustrates a side view of yet another step of the method in accordance with an embodiment of the invention.

A next step of the method involves providing further material sheets 3 through the access opening 16 while holding an upper edge 31 of the material sheets 3 with securing means in the form of a steel ring 32, as shown in FIG. 4. The material sheets 3 are secured to the ring 32 and hang down under the influence of gravity forces that act in the vertical direction 12.

A typical material sheet 3 contains about 820 g/m$^2$ of E-glass fibres per layer which yields a fibre volume fraction of about 30-35 vol. %. The material sheet 3 is about 5.5 m long (see length 33) and has a width 34 of about 0.45 m. As shown in the top view of FIG. 5, a number of materials sheets 3 is brought down in an overlapping fashion wherein edge parts of adjacent material sheets 3 overlap over an overlapping distance 35. The overlapping distance 35 may be the same for all sheets 3 or may differ between pair of sheets 3.

Figure 8:
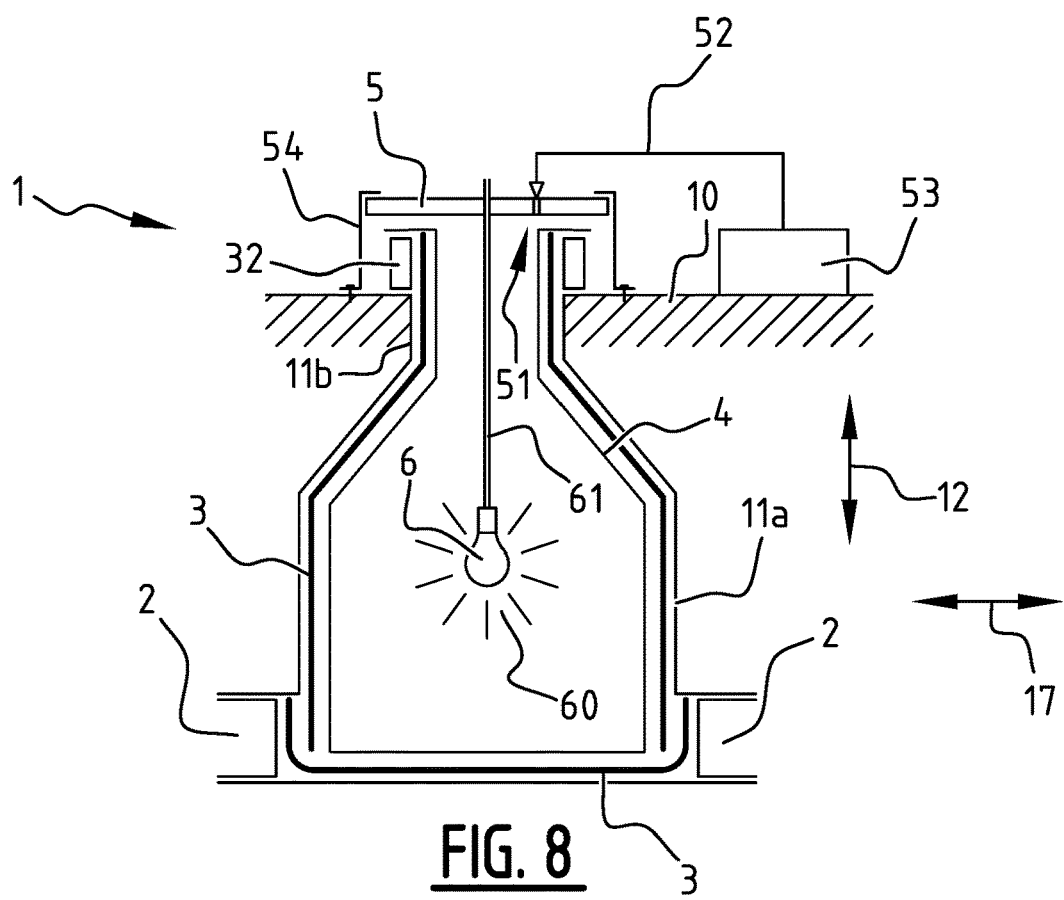
FIG. 8 schematically illustrates a cross-section of yet another step of the method in accordance with an embodiment of the invention.

In a next step of the method, the materials sheets 3 may be secured against the walls 11 as shown in FIG. 8 for instance. They are in this embodiment nailed against the walls 11 by applying nails through the material sheets 3 or by first applying patches of composite material (not shown) against the walls 3 to which the material sheets 3 are secured. In the embodiment shown, the material sheets 3 are secured against the walls 11 by inflating suitable inflatable pressure means in the form of latex balloon 4, as shown in FIG. 8.

Figure 9A:
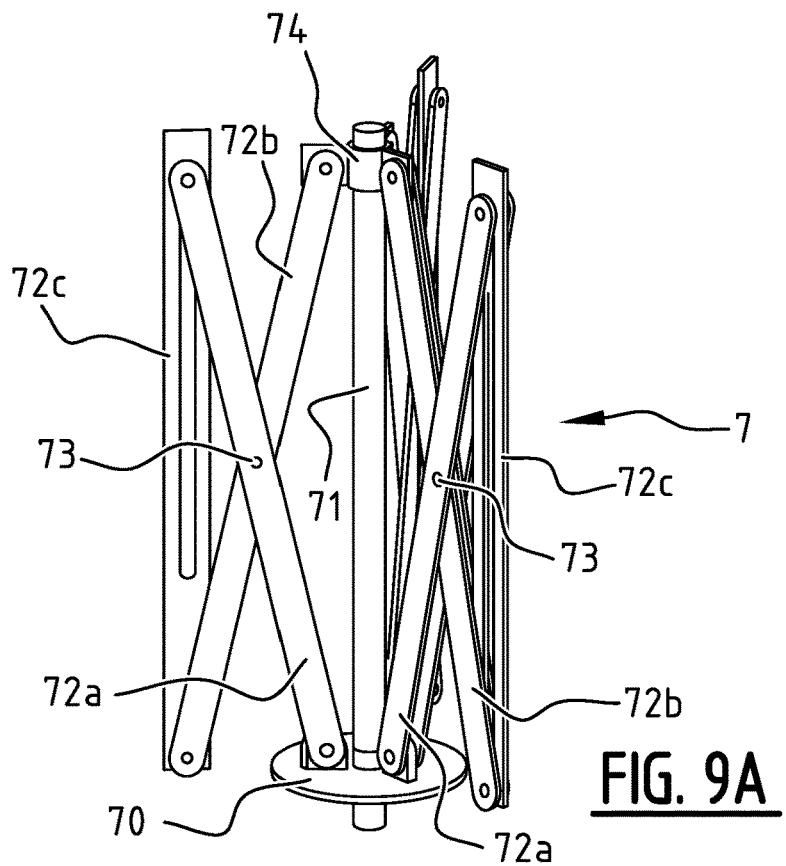
FIGS. 9A, 9B and 9C schematically illustrate an embodiment of a tool that can be used in the method to temporarily close off openings in a wall of the structure.
Figure 9B:
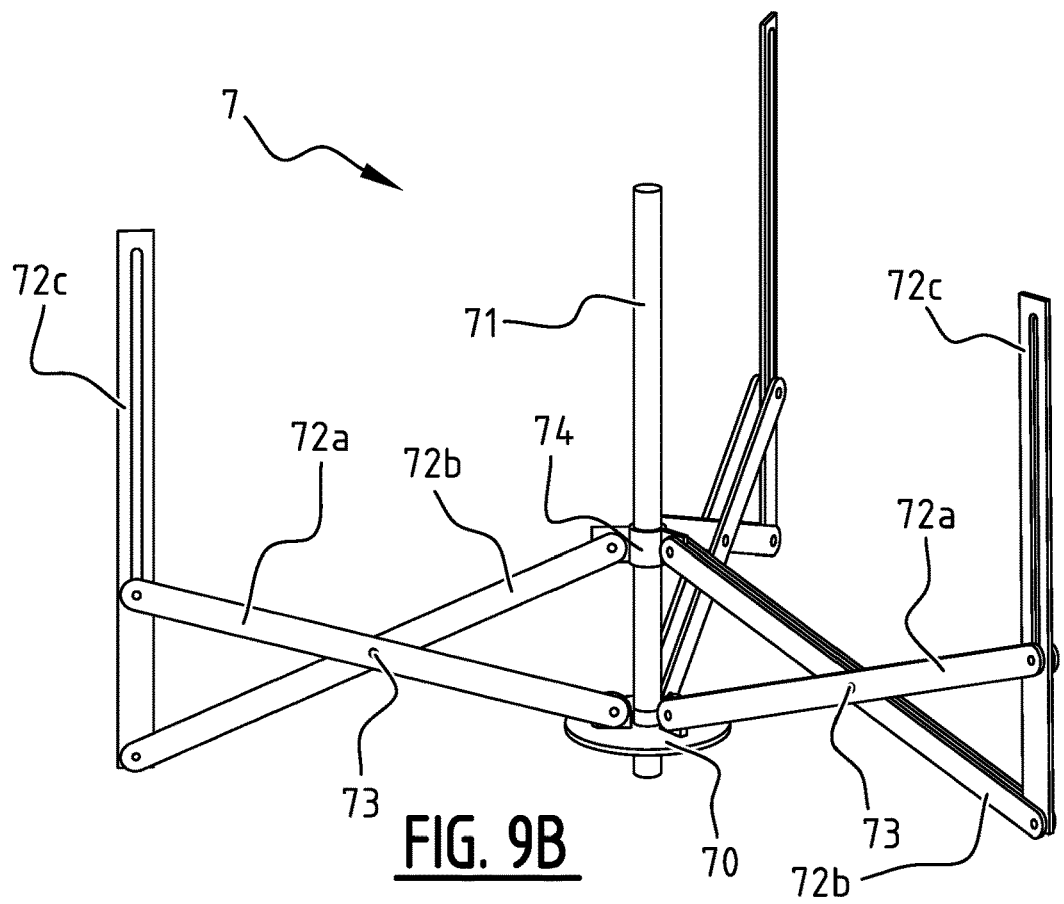
Figure 9C:
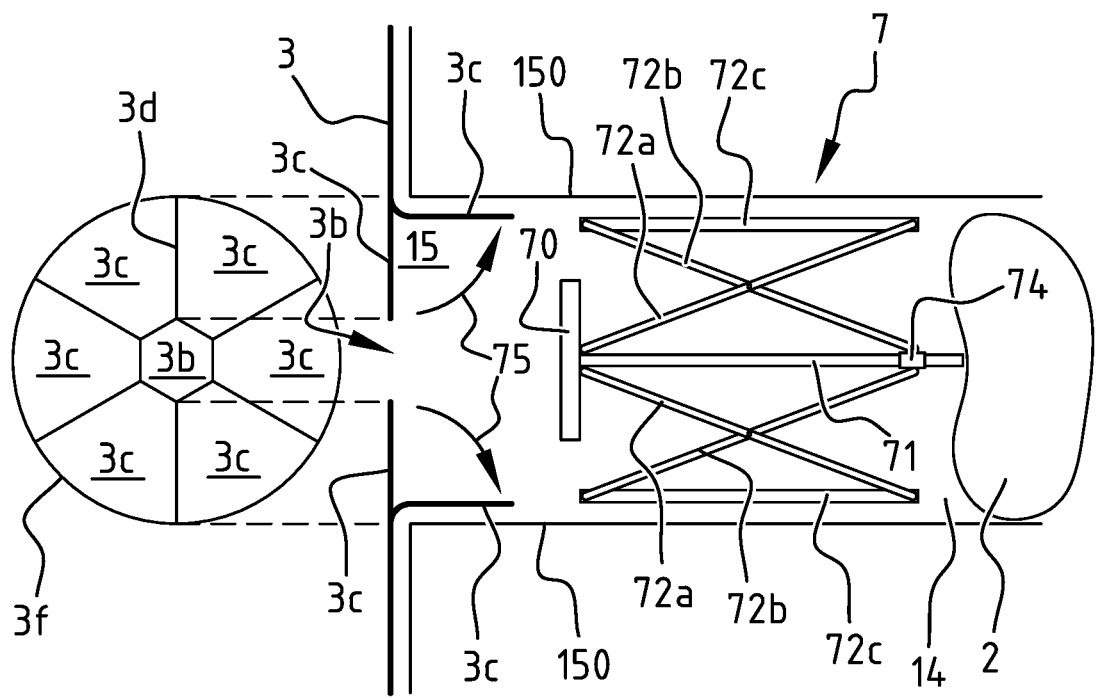

A tool may be used to prevent the plugs 2 from entering the hollow 12, or to prevent other leakage. A preferred tool 7 is shown in FIGS. 9A and 9B. The tool 7 comprises an end plate 70, provided at one end of a central shaft 71. A mechanism (72a, 72b, 72c) is attached to the end plate 70 and comprises three assemblies of shearing members (72a, 72b). One member 72a of each assembly is at one end hingedly connected to the end plate 70. The members (72a, 72b) can rotate or shear around a common hinge 73 in order to bring the mechanism from a (partly) folded-in position (FIG. 9A) to a folded-out position (FIG. 9B) in which outer members 72c may push against a wall of a hole 15, as shown in FIG. 9C. In this process, a ring 74, common to members 72b shifts downwards along the central shaft 71.

FIG. 9C illustrates one possible way to cover the walls 150 of a hole 15 with material sheet 3. The tool 7 is brought inside the hole with the central shaft 71 aligned along the extension of the sewerage pipeline 14, and the mechanism is operated to bring the members 72c against the walls 150. This secures the tool 7 inside the hole 15 and sewerage pipeline 14. A part of a sheet 3 hanging in front of the hole 15 is cut along lines 3d and a hole 3b is provided in the sheet 3. Flaps 3c are thus provided in the sheet 3, and the circumference 3f conforms substantially to the circumference of the hole 15. The flaps 3c are then brought against the walls 150 by folding them in the direction of the arrow 75. This can be done by the inflatable pressure means as further described below.

Figure 7:
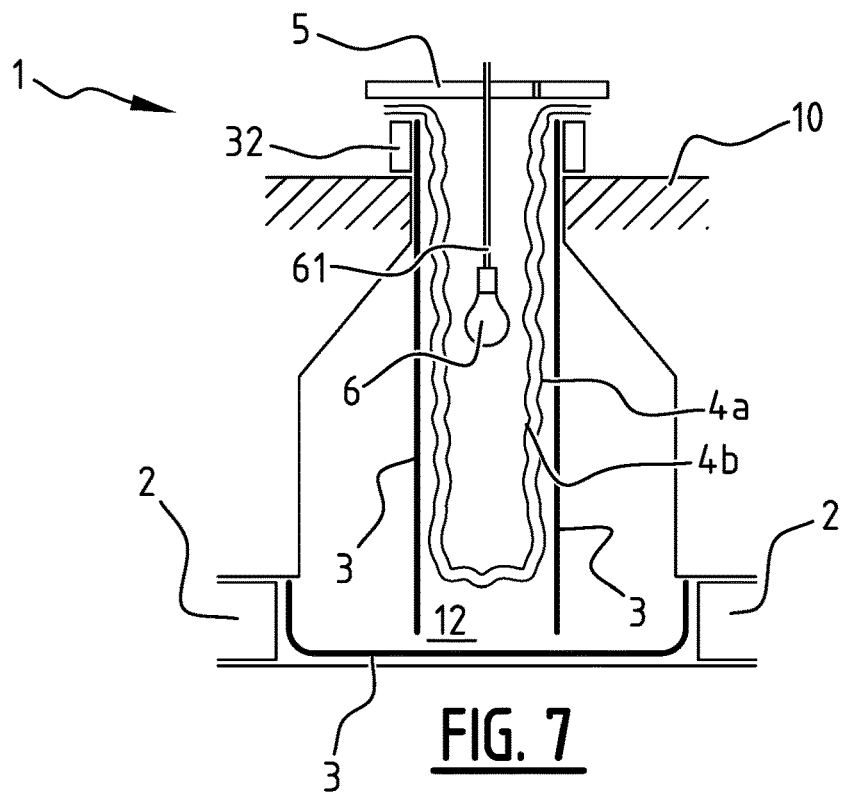
FIG. 7 schematically illustrates a cross-section of yet another step of the method in accordance with an embodiment of the invention.

The inflatable pressure means in the form of latex balloons (4a, 4b) is lowered inside the hollow 12 of the pit 1 in a deflated or partly deflated state. This step is shown in FIG. 7, which also illustrates that a cover 5 is applied on top of the ring 32 to be able to pressurize the hollow 12 below the cover 5. An upper rim 41 of each balloon 4 is clamped between the ring 32 and the cover plate 5. Please note than an improved method provides two balloons (4a, 4b) inside one other, as shown in FIG. 7, but applying one balloon 4 only, such as shown in FIG. 8, is also possible. The uninflated balloons (4a, 4b) when freely suspended have a shape with an internal volume exceeding the volume of the hollow 12 of the pit 1 by at most 5%.

A curing means in the form of a lamp 6 emitting UV-light 60 is then lowered inside the hollow 12 and inside the balloon 4 for curing the resin composition of the material sheets 3. To this end, the UV-light emitting lamp is held by a rope 61 or other manipulating device, such as a bar for instance.

As shown in FIG. 8, the balloon 4 is then inflated by pressurizing the air within the inside of the balloon 4 such that the balloon 4 comes to lay against the material sheets 3 and the walls 11 of the pit 1. Wrinkling is avoided at least in part by providing a balloon 4 in about the same shape as the hollow 12 of the pit 1. Pressurizing the air may be performed by a pressure line 52, connected to an opening 51 in the cover 5. The pressure line 51 is at another end attached to a pump 53. The cover 5 may be held against the ring 32 by any means, such as by brackets 54. The cover may be provided with a transparent air tight loop hole (not shown) in order to enable observing the inner cavity of the structure. The cover 5 allows pressurizing the inside of the balloon 4, preferably to a pressure of between 0.1 and 1 bar above atmospheric pressure.

In a further step, curing of the resin composition in the material sheets 3 takes place under the action of the UV-light emitting lamp 6 to adhere the material sheets 3 to the walls 11 of the pit 1. Before, during and/or after cure, the balloon 4 is inflated and applies pressure against the walls 11. The wall of the inflatable balloons (4a, 4b) is substantially translucent to UV-light to prevent incomplete or too slow cure. A postcure may be applied, if desired.

Also, the lamp 6 may be moved in the process of curing within the hollow 12 of the pit 1 in order to maintain a certain minimum distance to the walls 11. Suitable movements include moving the lamp 6 in the vertical direction 12 by pulling or releasing the rope 61, or movements in a radial direction 17. In the latter embodiment, a pushing or pulling device (not shown) acting on the lamp 6 is preferably applied.

The balloon 4 preferably is translucent to the radiation provided by the curing means, i.e. the lamp 6 according to an embodiment. Translucence may be measured according to well known methods and may depend on a number of factors, including the strains inside the pressurized balloon walls during curing, the initial thickness of the balloon walls, and the like. A suitable choice of these variables may be easily made by one skilled in the art without undue burden.

Figure 5:
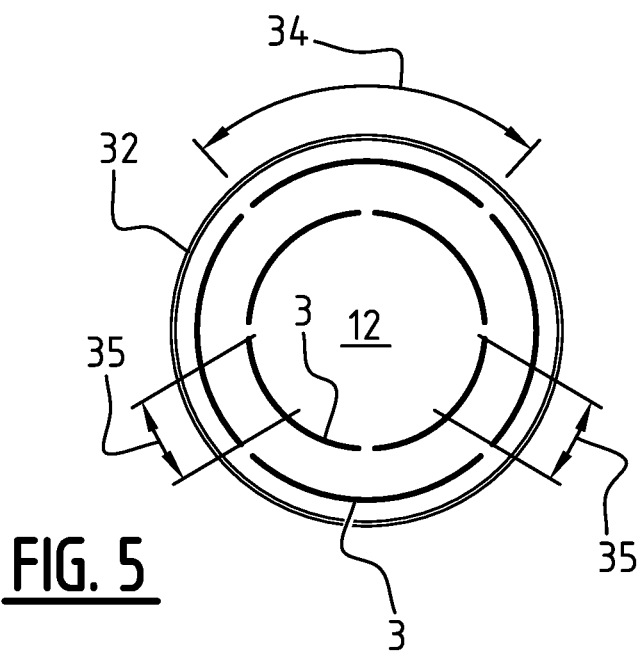
FIG. 5 schematically illustrates a top view of yet another step of the method in accordance with an embodiment of the invention.
Figure 6:
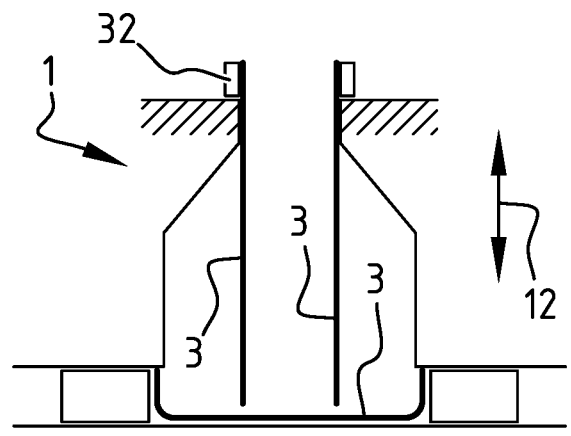
FIG. 6 schematically illustrates a cross-section of yet another step of the method in accordance with an embodiment of the invention.
Figure 10:
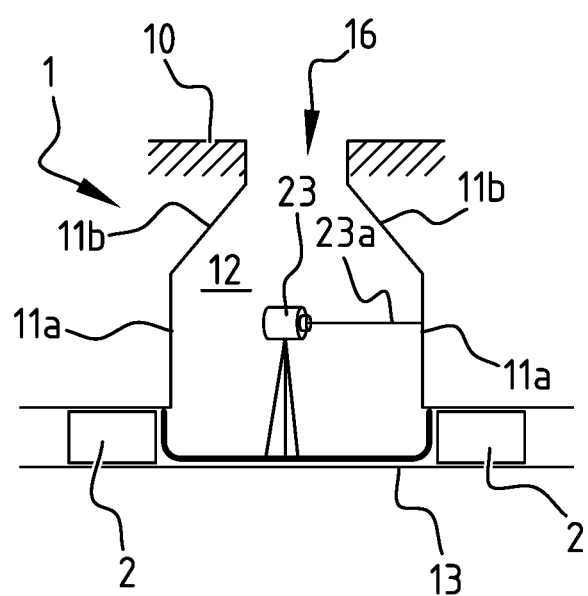
FIG. 10 schematically illustrates a cross-section of another step of the method in accordance with an embodiment of the invention.

According to another embodiment of the invention, a preform 40 which is configured to substantially conform to the shape of the interior 12 of the sewerage pit 1 when inflated outside the sewerage pit 1 is manufactured first. This may be done by providing a 3D model of the interior 12 of the sewerage pit 1. As shown in FIG. 10, a laser probe 23 is positioned inside the interior 12 of the sewerage pit 1 and projects a line of laser light 23a onto the surface of the walls 11a. Sensor cameras record the changing distance and shape of the laser line 23a in three dimensions (XYZ) as it sweeps along the walls 11a, including the floor. The point cloud data are then merged into a three-dimensional representation of the shape of the interior 12, and used to create a 3D CAD model of the geometry of the interior 12 of the sewerage pit 1. A mold 7 is then created from said geometric model, as shown in FIG. 5. The mold 7 accurately reproduces the shape (geometry) of the interior 12 of the hollow structure 1.

Figure 13:
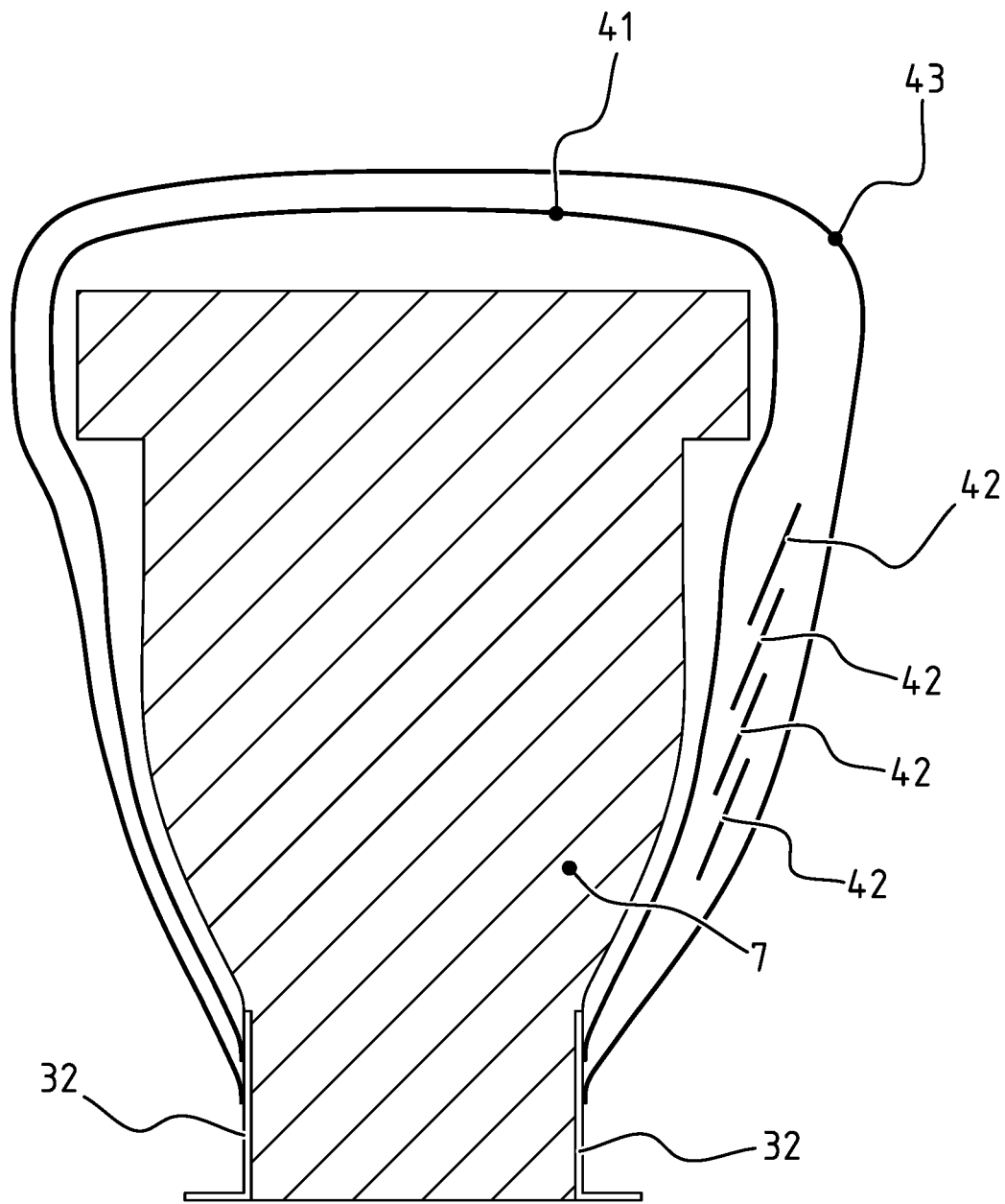
FIG. 13 schematically illustrates a method for manufacturing a preform in accordance with an embodiment of the invention.

As further shown in FIG. 13, the mold 7 is positioned upside down and a securing means in the form of a collar 32 is provided onto an under side of the mold 7 in this position. An inner covering layer 41 is then applied onto the outer surface of the mold 7 and secured to the collar 32. The inner covering layer 41 comprises a natural rubber bladder that is translucent to UV light. A plurality of material sheets 42 that comprise a woven fabric and/or UD fabric and a curable resin composition that is partially cured or thickened, is then applied onto the inner covering layer 41 to form a fibrous composite layer that covers the complete surface of the mold 7 and inner covering layer 41. As shown, the material sheets 42 are provided in a partly overlapping fashion, more particular in an imbricate fashion.

The materials sheets 42 comprise reinforcing E-glass fibres embedded in a thickened unsaturated polyester resin. The E-glass fibers are arranged in the form of two layers, each layer comprising a 0/90 UD fabric. A typical material sheet 42 contains about 820 g/m$^2$ of E-glass fibres per layer which yields a fibre volume fraction of about 30-35 vol. %. The material sheets 42 are about squarely shaped with a length and width of about 0.45 m.

FIG. 12 illustrates some embodiments of a preform 40 in which different patterns are shown for laying up material sheets 42. As shown in FIG. 12A, material sheets 42a, 42b, 42c are all squarely shaped and layed up in overlapping fashion, Indeed, a second sheet 42b is provided onto a first sheet 42a, and a third sheet 42c onto the second sheet 42b. An upper edge part of the second sheet 42b overlaps with a lower edge part of the first sheet 41a. In the same fashion, an upper edge part of the third 42c overlaps with a lower edge part of the second sheet 41b. Sheets 42b and 42c are also offset in a horizontal direction with respect to the first sheet 42a. Only three sheets 42 are shown in FIG. 12A but many sheets 42 are applied to cover the complete surface of the mold 7 and form a complete preform 40.

FIG. 12B shows another configuration in which sheets 42a, 42b, and 42c are aligned in a vertical direction and another set of aligned sheets 42d, 42e, and 42f is placed on top of sheets 42a, 42b, 42c such that right edge parts overlap with left edge parts of the sheets 42a, 42b, 42c. It goes without saying that many configurations are possible and the invention is not limited to any particular configuration of the material sheets 42.

An outer covering layer 43 is then applied onto the fibrous composite layer, and also attached to the collar 32. The outer covering layer 43 comprises a black polymeric film to avoid further curing during storage. The black film may be removed from the material sheets 42 before applying the preform 40 to the interior 12 of the sewerage pit 1.

The collar 32 is provided with a connection (not shown) for a vacuum pump. For storage and transport, an at least partial vacuum may be applied between the inner covering layer 41 and the outer covering layer 43. The mold 7 is then removed from the preform 40. This can be done by disassembling, by dissolving, by melting, by cutting, or by any other means known in the art. As shown in FIGS. 11 and 13, the collar 32 is integral to the produced preform 40. The preform 40 is secured to the collar 32 and, when lowering the preform 40 down into the sewerage pit 1, the preform 40 hangs down in an uninflated state under the influence of gravity forces that act in the vertical direction 12. The length 33 of the preform 40 and collar 32 may of course be chosen freely, depending on the shape of the interior 12 of the pit 1.

A next step of the method involves providing the preform 40 through the access opening 16 while holding an upper edge 31 of the preform 40 with the collar 32, as shown in FIG. 11.

The preform 40 or parts thereof may be secured against the walls 11 of the pit but this is not necessary. In the embodiment shown in FIG. 15, the preform 40 is moved towards the walls 11 (11a, 11b) and optionally secured against said walls 11 by inflating the preform 40 with suitable pressure means in the form of a pump 53.

Figure 14:
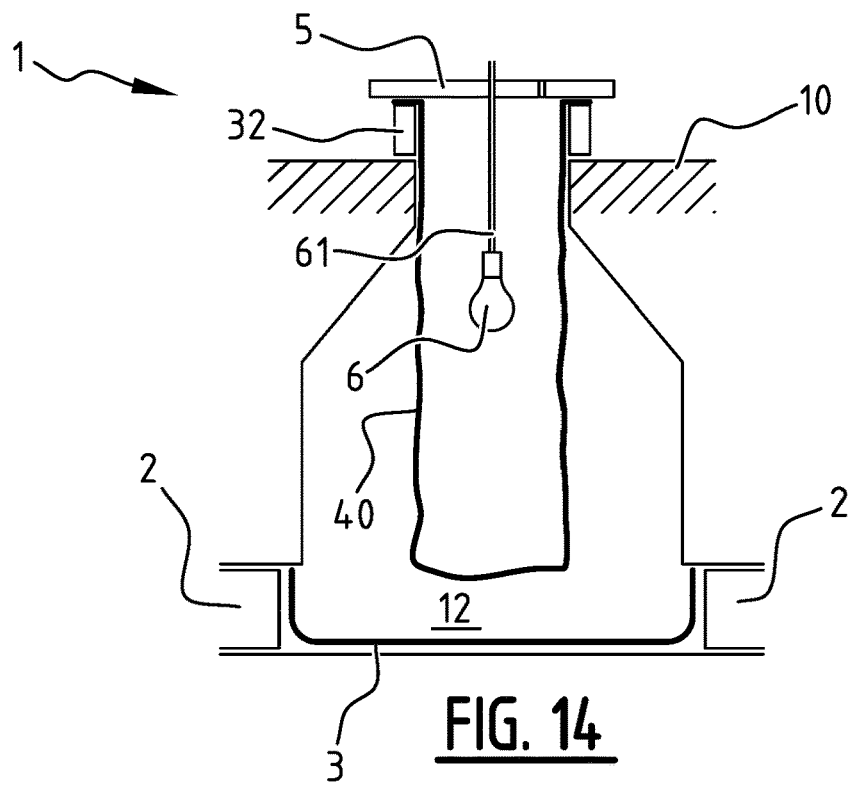
FIG. 14 schematically illustrates a cross-section of yet another step of the method in accordance with an embodiment of the invention.

The preform 40 is lowered inside the hollow 12 of the pit 1 in a deflated or partly deflated state, as appears from FIG. 14. FIG. 14 also illustrates that a cover 5 may be applied on top of the ring 32 to be able to pressurize the hollow 12 below the cover 5, and more in particular the interior of the preform 40. Part of the upper rim 31 of the preform 40 may be clamped between the collar 32 and the cover plate 5. Since the preform 40 is shaped in conformance with the geometry of the interior 12 of the pit 1, the uninflated preform 40 when freely suspended has a shape with an internal volume underrunning or exceeding the volume of the hollow 12 of the pit 1 by at most 5%.

Figure 15:
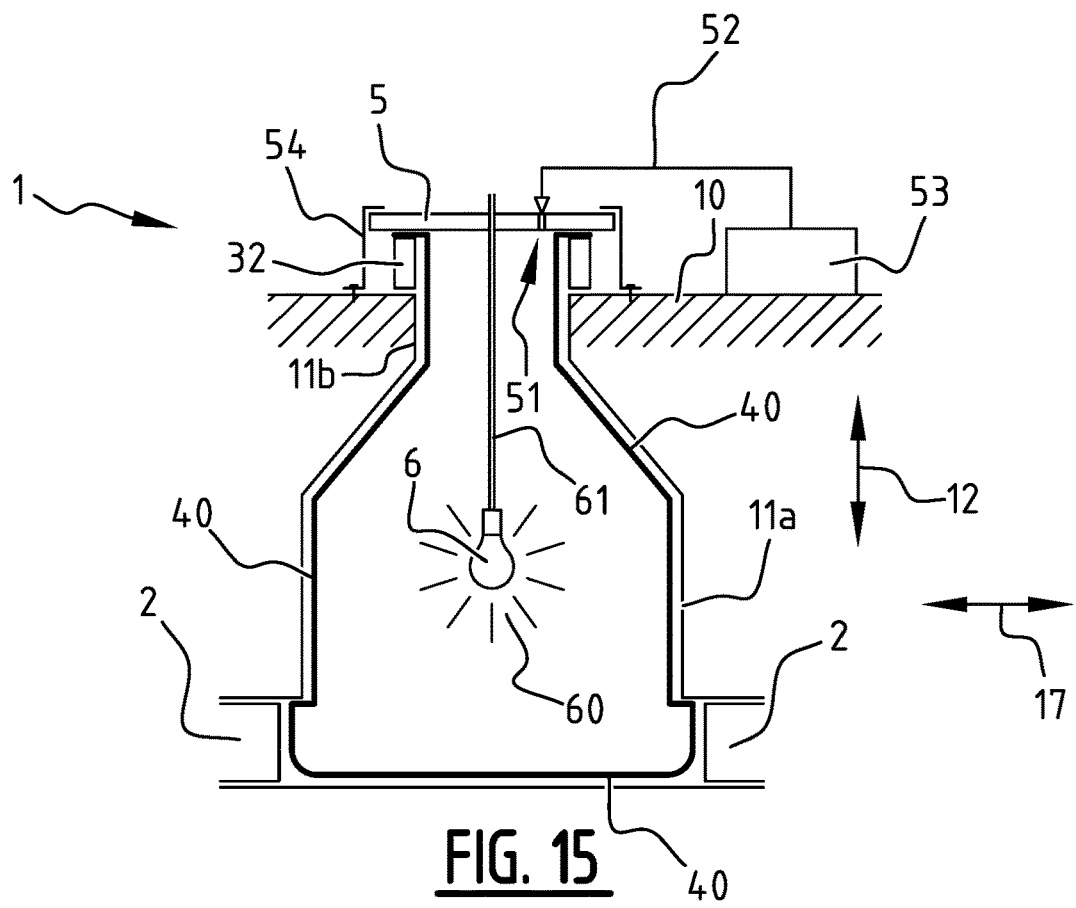
FIG. 15 schematically illustrates a cross-section of yet another step of the method in accordance with an embodiment of the invention.

As shown in FIG. 15, the preform 40 is inflated by pressurizing the air within the inside of the preform 40 such that the preform 40 comes to substantially adopt the geometry of the pit's interior 12 and lay against the walls 11 of the pit 1. Pressurizing the air may be performed by a pressure line 52, connected to an opening 51 in the cover 5. The pressure line 51 is at another end attached to a pump 53. The cover 5 may be held against the collar 32 by any means, such as by brackets 54. The cover may be provided with a transparent air tight loop hole (not shown) in order to enable observing the inner cavity of the structure. The cover 5 may be instrumental in pressurizing the inside of the preform 40, preferably to a pressure of between 0.1 and 1 bar above atmospheric pressure.

A curing means in the form of a lamp 6 emitting UV-light 60 is then lowered inside the hollow 12 and inside the preform 40 for curing the resin composition of the material sheets 42. To this end, the UV-light emitting lamp is held by a rope 61 or other manipulating device, such as a bar for instance. Curing of the resin composition in the material sheets 42 takes place under the action of the UV-light emitting lamp 6 to stiffen the material sheets 42 and the preform 40 and provide a stiff structure inside the interior 12 of the pit 1. At least an inner wall of the inflatable preform 40 is substantially translucent to UV-light to prevent incomplete or too slow cure. A postcure may be applied, if desired.

Also, the lamp 6 may be moved in the process of curing within the hollow 12 of the pit 1 in order to maintain a certain minimum distance to the walls 11. Suitable movements include moving the lamp 6 in the vertical direction 12 by pulling or releasing the rope 61, or movements in a radial direction 17. In the latter embodiment, a pushing or pulling device (not shown) acting on the lamp 6 is preferably applied.

At least an inner wall of the preform 40 preferably is translucent to the radiation provided by the curing means, i.e. the lamp 6 according to an embodiment. Translucence may be measured according to well known methods and may depend on a number of factors, including the strains inside the pressurized preform 40 walls during curing, the initial thickness of the balloon walls, and the like. Since the preform 40 is pre-formed in substantially the shape of the interior 12 of the pit 1, straining of the preform 40 walls is at least partly prevented, which improves curing behaviour of the material sheets 3 in the preform 40.

The invention claimed is:

1. Method for renovating the interior of a hollow structure, the method comprising providing an access opening to the hollow structure; providing a plurality of material sheets comprising reinforcing fibers and a curable resin composition of thermosetting type, the resin composition comprising an unsaturated polyester and/or vinylester resin/hardener mixture, wherein the curable resin composition of the material sheets is partially cured by comprising a thickening agent and thickening the resin composition before providing the material sheets against the wall, providing the plurality of material sheets through the access opening and against a wall of the hollow structure; providing an inflatable pressure means within the hollow of the structure; inflating the pressure means against the wall; providing a curing means within the hollow of the structure for curing the resin composition; and curing the resin composition to harden the material sheets and provide a renovated interior of the hollow structure and wherein two material sheets overlap over an overlap distance.

2. Method according to claim 1, wherein the hollow structure is an underground hollow structure, such as a sewerage pit.

3. Method according to claim 1, wherein the material sheets are provided against the wall of the hollow structure while holding an upper edge of the material sheets with securing means.

4. Method according to claim 1, further comprising providing an inflatable preform that comprises the material sheets, which preform is configured to substantially conform to the interior shape of the hollow structure when inflated outside the hollow structure; and which preform also acts as the inflatable pressure means.

5. Method according to claim 4, wherein the preform is provided inside the hollow structure through an access opening of the hollow structure while holding an upper edge of the preform with securing means.

6. Method according to claim 5, wherein the securing means is part of the preform.

7. Method according to claim 4, wherein the material sheets of the preform are contained in an envelope comprising an inner covering layer facing the inside of the preform and an outer covering layer facing the outside of the preform.

8. Method according to claim 7, wherein an at least partial vacuum is applied within the envelope.

9. Method according to claim 7, wherein a covering layer comprises a polymeric film.

10. Method according to claim 1, wherein the wall of the hollow structure is an upright wall.

11. Method according to claim 1, wherein a bottom part of the structure is provided with material sheets.

12. Method according to claim 1, wherein the material sheets are secured against a wall of the hollow structure by applying fastening means.

13. Method according to claim 12, wherein the fastening means comprise mechanical fasteners such as nails and screws; or adhesive fasteners such as patches of fiber-reinforced adhesive; or combinations of both.

14. Method according to claim 1, wherein the uninflated pressure means when freely suspended has a shape with an internal volume exceeding the volume of the hollow of the structure by at most 20%.

15. Method according to claim 4, wherein the inflatable pressure means and/or the preform is manufactured by providing a mold having substantially the shape of the hollow, and forming the pressure means in said mold.

16. Method according to claim 1, wherein the inflatable pressure means comprises a rubber bladder.

17. Method according to claim 7, wherein the inflatable pressure means and/or at least a covering layer of the envelope of the preform is substantially translucent to the curing means.

18. Method according to claim 1, wherein the curing means comprises a source of heat, light and/or sound.

19. Method according to claim 18, wherein the curing means comprises a source of UV-light.

20. Method according to claim 1, wherein the curing means is moved within the hollow of the structure.

21. Method according to claim 1, wherein the wall of the hollow structure comprises holes and said holes are covered before applying the material sheets.

22. Method according to claim 1, wherein the reinforcing fibers of the material sheets comprise glass fibers, carbon fibers, cellulose, sisal and jute fibers or steel fibers, or combinations of these.

23. Method for renovating the interior of a hollow structure, the method comprising providing an access opening to the hollow structure; providing a plurality of material sheets comprising reinforcing fibers and a curable resin composition of thermosetting type, the resin composition comprising an unsaturated polyester and/or vinylester resin/hardener mixture, wherein the curable resin composition of the material sheets is partially cured by comprising a thickening agent and thickening the resin composition before providing the material sheets against the wall, providing the plurality of material sheets through the access opening and against a wall of the hollow structure; providing an inflatable pressure means within the hollow of the structure; inflating the pressure means against the wall; providing a curing means within the hollow of the structure for curing the resin composition; and curing the resin composition to harden the material sheets and provide a renovated interior of the hollow structure, and wherein the material sheets are secured against a wall of the hollow structure by applying fastening means.

24. Method for renovating the interior of a hollow structure, the method comprising providing an access opening to the hollow structure; providing a plurality of material sheets comprising reinforcing fibers and a curable resin composition of thermosetting type, the resin composition comprising an unsaturated polyester and/or vinylester resin/hardener mixture, wherein the curable resin composition of the material sheets is partially cured by comprising a thickening agent and thickening the resin composition before providing the material sheets against the wall, providing the plurality of material sheets through the access opening and against a wall of the hollow structure; providing an inflatable pressure means within the hollow of the structure; inflating the pressure means against the wall; providing a curing means within the hollow of the structure for curing the resin composition; and curing the resin composition to harden the material sheets and provide a renovated interior of the hollow structure, and wherein the wall of the hollow structure comprises holes and said holes are covered before applying the material sheets.

25. Method for renovating the interior of a hollow structure, the method comprising providing an access opening to the hollow structure; providing a plurality of material sheets comprising reinforcing fibers and a curable resin composition of thermosetting type, the resin composition comprising an unsaturated polyester and/or vinylester resin/hardener mixture, wherein the curable resin composition of the material sheets is partially cured by comprising a thickening agent and thickening the resin composition before providing the material sheets against the wall, providing the plurality of material sheets through the access opening and against a wall of the hollow structure; providing an inflatable pressure means within the hollow of the structure; inflating the pressure means against the wall; providing a curing means within the hollow of the structure for curing the resin composition; and curing the resin composition to harden the material sheets and provide a renovated interior of the hollow structure; and further comprising providing an inflatable preform that comprises the material sheets, which preform is configured to substantially conform to the interior shape of the hollow structure when inflated outside the hollow structure; which preform also acts as the inflatable pressure means; and wherein the material sheets of the preform are contained in an envelope comprising an inner covering layer facing the inside of the preform and an outer covering layer facing the outside of the preform.

* * * * *